United States Patent [19]

Chouinard et al.

[11] Patent Number: 4,631,602
[45] Date of Patent: Dec. 23, 1986

[54] PROCESS FOR THERMOREMANENT DUPLICATION OF MAGNETIC TAPES USING TRANSVERSE LASER BEAMS SPANNING THE TAPE WIDTH

[75] Inventors: Michael P. Chouinard, Newark; Lewis C. Bancroft, Wilmington, both of Del.

[73] Assignee: E. I. Du Pont de Nemours and Company, Wilmington, Del.

[21] Appl. No.: 774,885

[22] Filed: Sep. 11, 1985

Related U.S. Application Data

[63] Continuation of Ser. No. 449,277, Dec. 13, 1982, abandoned.

[51] Int. Cl.$^4$ .......................... G11B 5/86; G11B 15/60
[52] U.S. Cl. ...................................................... 360/16
[58] Field of Search ........................ 360/16, 15, 17, 59

[56] References Cited

U.S. PATENT DOCUMENTS

| | | | |
|---|---|---|---|
| 3,108,728 | 10/1963 | Selsted | 226/95 |
| 3,496,304 | 2/1970 | Nelson | 360/16 |
| 3,613,102 | 10/1971 | Daly et al. | 346/74 MT |
| 3,632,898 | 1/1972 | Slade | 360/16 |
| 3,761,645 | 9/1973 | Stancel, Jr. et al. | 179/100.2 CR |
| 3,825,948 | 7/1974 | Hendershot, III et al. | 360/16 |
| 3,928,747 | 12/1975 | Hanai et al. | 219/216 |
| 4,213,159 | 7/1980 | King | 360/16 |

FOREIGN PATENT DOCUMENTS 2425641 12/1974 Netherlands .

OTHER PUBLICATIONS

J. J. Hagopian, "Thermomagnetic Transfer Mass Storage", IBM Technical Disclosure Bulletin, vol. 16, No. 12, May 1974.
W. B. Hendershot, III, "Thermal Contact Duplication of Videotape", Journal of the SMPTE, vol. 80, No. 3, Mar. 1971.
Matsumoto, "The Application of Piezoremanent Magnetization to Magnetic Contact Printing", IEEE Transactions on Magnetics, vol. Mag. 16, No. 5, Sep. 1980, RCA Technical Notes, TN No. 991, Dec. 1976.

Primary Examiner—Vincent P. Canney
Assistant Examiner—Alyssa H. Bowler

[57] ABSTRACT

Thermoremanent duplication of a magnetic tape particularly adapted to laser heating whereby a copy tape is heated and cooled, for example, in a nip of two rolls while in contact with a master tape.

26 Claims, 1 Drawing Figure

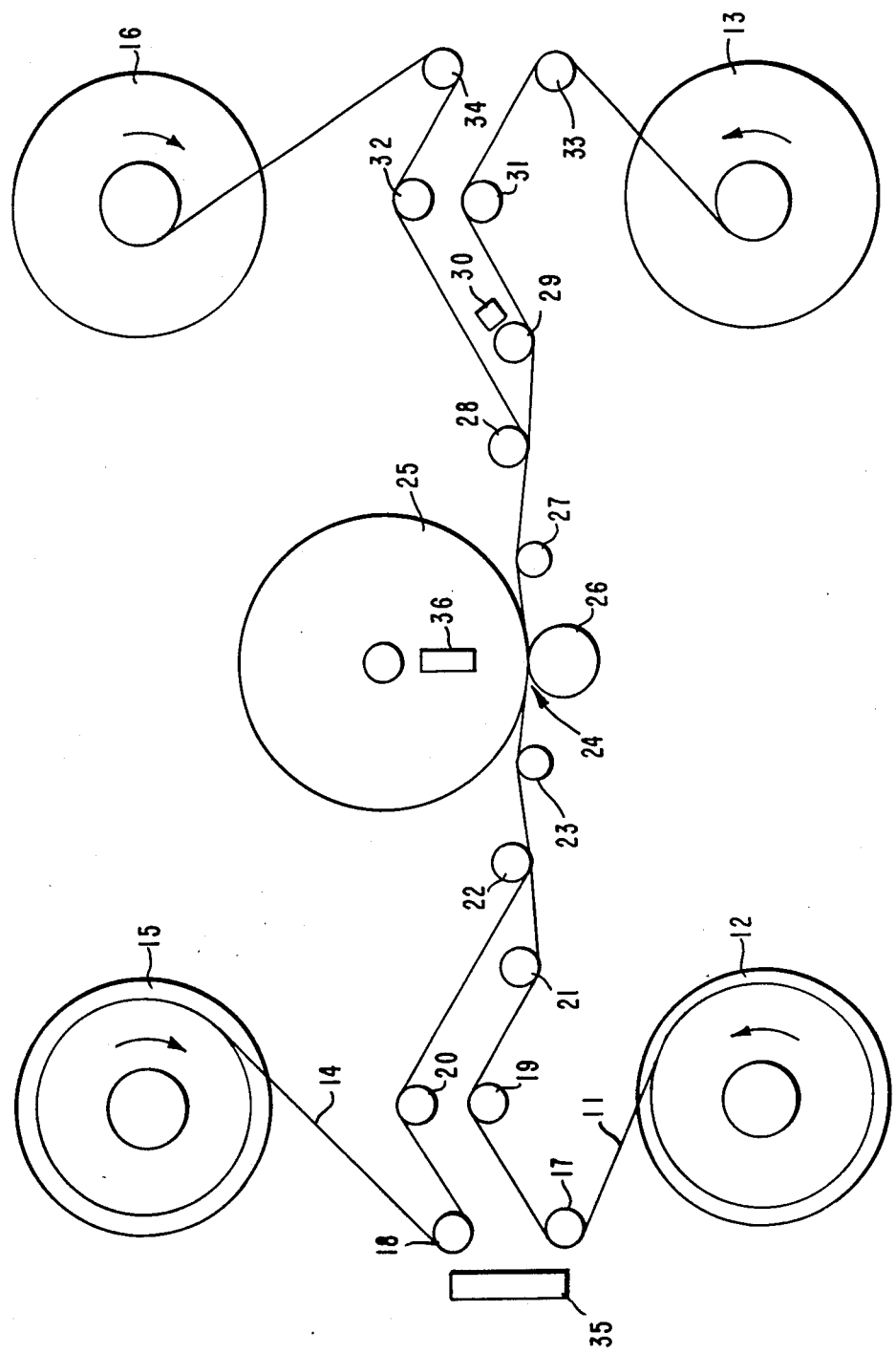

PROCESS FOR THERMOREMANENT DUPLICATION OF MAGNETIC TAPES USING TRANSVERSE LASER BEAMS SPANNING THE TAPE WIDTH

This is a continuation of application Ser. No. 449,277, filed Dec. 13, 1982, now abandoned.

BACKGROUND OF THE INVENTION

The invention relates to an improved method for the thermoremanent duplication of magnetic tapes using radiant heating and contact cooling with applied pressure, controlled tension, and precision tape guidance.

Currently, the videotape industry duplicates videotapes at substantial expense by using many copiers to electronically reproduce from a master tape at normal slow playback speed. The master tape is run in real time while up to 1000 copiers in one room record the information. A need exists for a reproduction method which is faster and less costly.

Magnetic tapes have been previously reproduced by anhysteretic contact printing in which the master tape and the copy are placed in face to face contact and exposed to a decaying a.c. magnetic field. (Herr et al. U.S. Pat. No. 2,738,383). Reproduction by this means, however, requires high coercivity master tapes and transfers signals weaker than those present in the master.

Also previously proposed has been a method of duplication involving thermoremanent transfer wherein the blank copy magnetic tape is heated above its Curie point and thereafter cooled in intimate contact with the prerecorded master tape whereby the signals of the master are transferred to the copy tape. (Greiner et al. U.S. Pat. No. Re 28,290; Daly et al. U.S. Pat. No. 3,612,102; Hoell U.S. Pat. No. 3,699,267; Lemke U.S. Pat. No. 3,541,577; Kumada U.S. Pat. No. 3,465,105, Kobayashi et al. U.S. Pat. No. 3,824,617.)

Thermoremanent reproduction has the advantage that the copied magnetic recording may have an even greater intensity of signal than that of the original. However disadvantages in previous thermal remanent copying systems have included (1) overheating of the base film resulting in physical distortions which produce electronic timing errors during playback and (2) high frequency roll-off, that is the loss in transfer of high frequencies, due to the inadequate contact pressure between master and copy.

One attempt to control overheating of the base film and prevent high frequency roll-off has been using a finely focussed laser beam to provide rapid localized heating of the copy tape magnetizable particles to a temperature above their Curie point. The laser spot size is approximately 5 μm commensurate with the magnetic particle size. A scanning laser beam to cover the entire tape width is required (Stancel U.S. Pat. No. 3,761,645).

SUMMARY OF THE INVENTION

The present invention is directed to a process for replicating a magnetic pattern onto a moving flexible magnetizable recording member containing a particulate layer with chromium dioxide particles on a flexible support transparent to a beam of energy which comprises (a) passing the magnetizable recording member and a flexible prerecorded magnetizable medium through a nip of two rolls, one of said rolls being transparent to the beam of energy and facing the recording member and at least one of said rolls being compressible, the chromium dioxide particles facing said prerecorded magnetizable medium, (b) passing a continuous beam of energy through the transparent roll and the flexible support of the magnetizable recording member to simultaneously heat chromium dioxide particles across a width of the recording member on which a magnetic particle is to be replicated for a time period in the range of from 0.01 to 5 milliseconds while in said nip and in contact with the prerecorded magnetizable medium, said chromium dioxide particles being heated to above their Curie temperature, (c) cooling the chromium dioxide particles to below their Curie temperature while in intimate contact with the prerecorded medium in said nip for a time period in the range from 0.1 to 100 milliseconds.

BRIEF DESCRIPTION OF THE DRAWING

The FIGURE is a stylized representation of an apparatus for duplicating prerecorded master magnetic tape.

DETAILED DESCRIPTION OF THE INVENTION

In accordance with the present invention chromium dioxide particles of a recording member, contact a prerecorded magnetizable medium in a nip of two rolls. The recording member is also referred to herein as a copy tape while the prerecorded magnetizable medium is also referred to as a master tape. Heating of the chromium dioxide particles to at least the Curie temperature takes place, i.e., the temperature where the magnetic particles lose their magnetization. Thereafter cooling of the chromium dioxide particles occurs in the nip of the two rolls while in contact with the master tape to orient the magnetic domains of the chromium dioxide material to the magnetization pattern of recorded information on the master tape. In the present invention both the heating and cooling steps take place while the recording member containing chromium dioxide particles and the prerecorded master are in contact in a nip of two rolls. Heating of the chromium dioxide particles to the Curie temperature prior to entry into the nip does not take place.

The chromium dioxide particles are embedded in a polymer matrix, typically a polyurethane elastomer and this coating is supported on a flexible material which is transparent to a beam of energy used for heating. In the present context the material allows at least a significant quantity of the energy beam to pass without being absorbed to allow heating of the chromium dioxide particles and minimize the heating of the flexible material. The energy source which is used to heat the chromium dioxide coating is dependent on the flexible material used to support the particles. Suitable heating sources include incandescent and electrical discharge lamps, with laser heating preferred. Suitable support materials include polyester, polyolefin, cellulose and other traditional photographic and magnetic support media.

Since heating of the chromium dioxide particles takes place while in the nip of two rolls, the energy beam by necessity must pass through the roll supporting the recording member. The source of the beam of energy can be placed inside this roll but more preferably is outside the roll and the beam is controlled by an optical system. The material of this roll must likewise be transparent to the beam of energy in addition to the support for the chromium dioxide particles. The heating source, preferably a laser, emits a continuous beam of energy which simultaneously heats the chromium dioxide particles across a width of the recording member on which the magnetic pattern is to be replicated. "Simultaneously" in the present context excludes traversal, such as a scanning pattern, of the energy beam across the recording member. The width of the recording member which is to receive the magnetic pattern is heated simultaneously without deflection of the energy pattern in a scanning mode.

It is necessary in the present invention that one of the two rolls is compressible, i.e., it provides "a footprint" to extend nip contact between the rolls sufficient to keep the recording member and prerecorded magnetizable medium in a pressure contact during the heating and cooling steps.

The heating duration of the chromium dioxide particles will be in the range of 0.01 to 5 milliseconds and generally 0.1 to 0.4 milliseconds. Criticality is present in the need to maintain intimate pressure contact of the tapes during the heating and cooling steps.

The cooling period of the chromium dioxide particles while in the nip and in contact with the prerecorded medium is in the range of 0.1 to 100 milliseconds and generally 0.5 to 4 milliseconds. The duration of the time in the nip is dependent not only on the size and compressibility of one or more rolls, but also on the speed the tapes run through the nip. Typical tape speeds are 25 inches per second to 100 inches per second. One of the rolls forming the nip should be compressible.

The pressure on the tapes in the nip generally will be at least 5 psi and conventionally will be in the range of 15 to 500 psi and more generally 50 to 250 psi. The heating and cooling steps which are both carried out in the nip have an advantage that elongation of a tape due to tension is minimized particularly due to softening of a polymeric support material at elevated temperature. Also one or both rolls can be cooled. Additionally adjustment of the rolls allows the pressure in the nip to be varied irrespective of the thickness of the two tapes.

Referring to the FIGURE, the apparatus includes a master tape 11, a master feed reel 12, a master take-up reel 13, a copy tape 14, a copy feed reel 15, and a copy take-up reel 16. Conventional tape drive devices may be employed for driving reels 12, 13, 15 and 16 in the direction of movement as shown by arrows. Tape 11 fed from reel 12 and tape 14 fed from reel 15 are guided around idler rolls 17 and 18 respectively, past detector assembly 35, over tensiometers 19 and 20 respectively. Tape 11 passes under idler roll 21, and both tapes are brought together under guide roll 22, with magnetic surfaces in face to face contact. Tapes 11 and 14 travel together over cooled reference roll 23 through magnetic transfer assembly, generally designated as 24, where thermoremanent transfer of the information from the tape 11 to tape 14 occurs.

The magnetic transfer assembly includes a print wheel 25 and a nip roll 26.

Print wheel 25 is a cooled hollow transparent roll of 8 inch diameter. Cooling is both internal and external by dry chilled air of around 50° F. (10° C.). The print wheel 25 can be made of polymethyl methacrylate with an internal antireflective coating. The print wheel 25 is hollow and transparent in order to pass a beam of energy 36, preferably laser light, to the outside of the wheel surface.

Nip roll 26 is a cooled, coated roll of 2 inch diameter. Cooling is both internal and external by dry, chilled air of around 50° F. Roll 26 can be coated with a elastomeric coating, such as 0.055 inch (1.140 cm) Adiprene ® polyurethane rubber.

The area of contact of the print wheel 25 with nip roll 26 or footprint area is 0.10" (0.254 cm). Pressure maintained in the nip roll assembly generally exceeds 100 psi.

Tapes 11 and 14 exit the magnetic transfer assembly 24 passing over cooled reference roll 27, under guide roll 28, and are separated as tapes 11 and 14 continue over tensionmeters 31 and 32, respectively, around idler rolls 33 and 34, respectively to master take-up reel 13 and copy take-up reel 16 respectively.

Reference rolls 23 and 27 on either side of magnetic transfer assembly 24 can have reference edges to provide edge guidance to the master and copy tapes so that they will track together for duplication.

Magnetic pick-up head 30 is a means for determining and controlling optimum machine speed at a given energy flux level for preferred signal transfer. Signals derived from the pick-up head allow for adjustment in either machine speed or energy flux level.

Detector assembly 35 is a means for determining the presence of tapes 11 and 14. Information derived from this assembly protects the nip roll 26 from damage due to the beam of energy. The beam is turned off when no tape is detected.

The preferred laser beam for this invention is a neodymium-doped yttrium-aluminum-garnet (YAG) emitting light of a single wavelength of 1.06 microns. The polyester base film is transparent to this laser wavelength and a temperature profile is established which is low throughout the support film width but high at the film-particle reference. In this manner the copy film base exits the heating-transfer zone only 25° to 60° C. higher than it entered, below the glass transition temperature of the polymer above which tape distortion could occur.

The Nd-Yag rod emits a ¼" diameter beam which is then expanded through an up-collimator, shaped into a rectangular pattern, redirected by two prisms and focused by a cylindrical lens to a line ½"×0.010" which shines through the transparent print wheel surface onto the copy tape 14 and spans the tape width providing uniform power density distribution across the tape width.

Master magnetic tape 11 consists preferably of a support of polyethylene terephthalate and a magnetizable layer of higher Curie point than the copy magnetizable layer such as iron alloy particles, cobalt-modified iron oxide particles or $CrO_2$ particles with elevated Curie temperatures.

The copy magnetic tape 14 consists preferably of a support of polyethylene terephthalate and a magnetic layer containing about 50% by volume of $CrO_2$ with Curie temperature of about 130° C.

The master tape 11 may include information ranging in wavelength from 0.03 inches to $20 \times 10^{-6}$ inches (0.076 cm to $50.8 \times 10^{-6}$ cm).

- EXAMPLE

The apparatus described in the FIGURE was used to copy a helical scan video pattern on ½ inch (1.27 cm) tape from a metal particle mirror master to an unrecorded chromium dioxide copy tape. Heating was by an infrared laser beam projecting through the transparent roll and focusing into a narrow line across the tape. The copy tape was cooled in exact register with the master tape while constrained in the "footprint" of the nip and guided against the synchronization edge as a mechanical reference.

The color video program was successfully reproduced with good color, definition, and tracking. Essentially no dimensional change in the polyester support of the copy tape was experienced.

System parameters were as follows:

| | |
|---|---|
| Master tape | Iron alloy metallic particles in a polymeric binder |
| | Pre-recorded in a mirror master pattern, VHS format |
| | Width 0.500" (1.27 cm) |
| | Thickness 0.00088" (0.0022 cm) |
| | Coating thickness 0.000210" (0.0005 cm) |
| | DC Coercivity 1870 Oersteds |
| | Retentivity 2300 gauss |
| Copy tape | CrO$_2$ particles in a polymeric binder |
| | Standard type VHS T-120 video tape from PD Magnetics Inc. |
| | Width 0.500" (1.27 cm) |
| | Thickness 0.00073" (0.0019 cm) |
| | Coating thickness 0.00012" (0.0003 cm) |
| | DC Coercivity 550 Oersteds |
| | Retentivity 1400 gauss |
| Nip Rolls | |
| Transparent Roll | Composition - polymethyl methacrylate resin |
| | Diameter 8" |
| | Cooled by a flow of dry air at 18° C. |
| Elastomeric Roll | Composition-Aluminum coated with 0.055" Adiprene ® polyurethane rubber |
| | Elastomer Durometer 80 |
| | Nip footprint length at 21 lb force: 0.1 inch (0.254 cm) |
| Laser | Neodymium: Yttrium-Aluminum Garnet, continuous output |
| | Wavelength 1.06 microns |
| | Power 74 watts output |
| | Power to tape 30 W |
| Optics | Line focused at interface of copy tape coating and polyester support; width .01" (0.0254 cm) |
| Tape Guidance | Each tape guided from edge nearest synchronization track |
| | Feed and takeup tensions about 30 grams |
| Tape Speed | 25 in/sec (63.5 cm/sec) |
| Heating Time | 400 microseconds (0.01" at 25 IPS) |
| Cooling Time in Nip | About 2 milliseconds (½ of nip length 0.1" at 25 IPS) |
| | Nip pressure 420 psi |

What is claimed is:

1. A process for replicating a magnetic pattern on a moving flexible magnetizable recording member containing a particulate layer with chromium dioxide particles on a flexible support transparent to a beam of energy which comprises
   (a) passing the magnetizable recording member and a flexible prerecorded magnetizable medium through a nip of two rolls, one of said rolls being transparent to the beam of energy and facing the recording member and at least one of said rolls being compressible, the chromium dioxide particles facing said prerecorded magnetizable medium wherein the prerecorded magnetizable medium has a higher Curie temperature than the layer with chromium dioxide particles of the magnetizable recording member,
   (b) passing a beam of continuous energy through the transparent roll and the flexible support of the magnetizable recording member to simultaneously heat chromium dioxide particles across the width of the recording member on which a magnetic pattern is to be replicated for a time period in the range of from 0.01 to 5 milliseconds while in said nip and in contact with the prerecorded magnetizable medium, said chromium dioxide particles being heated to above their Curie temperature,
   (c) cooling the chromium dioxide particles to below their Curie temperature while in intimate contact with the prerecorded medium in said nip for a time period in the range from 0.1 to 100 milliseconds.

2. The process of claim 1 wherein the chromium dioxide particles are heated for 0.1 to 0.4 milliseconds.

3. The process of claim 1 wherein the chromium dioxide particles are cooled for 0.5 to 4 milliseconds.

4. The process of claim 1 wherein the recording member and the prerecorded magnetizable medium each moves at the same speed in the range of 25 to 100 inches per second.

5. The process of claim 1 wherein the beam of energy is from a laser.

6. The process of claim 1 wherein the pressure at the nip upon the recording member and the magnetizable medium is at least 5 pounds per square inch.

7. The process of claim 6 wherein the pressure is in the range of from 15 to 500 pounds per square inch.

8. The process of claim 7 wherein the pressure is in the range of from 50 to 250 pounds per square inch.

9. The process of claim 1 wherein the beam of energy is formed to a stationary line beam which spans the width of the recording member.

10. The process of claim 8 wherein the beam of energy is a laser.

11. An apparatus comprising
    (a) supply and takeup means for a flexible magnetizable recording member,
    (b) supply and takeup means for a flexible prerecorded magnetizable medium,
    (c) opposite facing rolls to allow contact of the recording member and the magnetizable medium in a nip of the two rolls, at least one of the rolls being compressible and at least one of the rolls being transparent to a beam of energy,
    (d) heating means to generate a continuous line beam of energy which is directed without scanning through at least a portion of the roll which is transparent to the energy beam.

12. The apparatus of claim 11 wherein the heating means is a laser.

13. The apparatus of claim 11 wherein the heating means has means to allow focusing to a stationary line beam which line beam is aligned parallel to the axis of the roll which is transparent to the energy beam and spans the width of the recording member with substantially uniform power density.

14. The apparatus of claim 13 wherein the heating means is a laser.

15. The apparatus of claim 13 wherein the heating means is a laser.

16. A process for replicating a magnetic pattern on a moving flexible magnetizable recording member containing a particulate layer with chromium dioxide particles on a flexible support transparent to a beam of energy which comprises
    (a) passing the magnetizable recording member and a flexible prerecorded magnetizable medium into pressure contact with one another whereby said contact is maintained during steps (b) and (c), with the chromium dioxide particles facing said prerecorded magnetizable medium wherein the prerecorded magnetizable medium has a higher Curie temperature than the layer with chromium dioxide particles of the magnetizable recording member, (b) passing a beam of continuous energy through the flexible support of the magnetizable recording member to simultaneously heat chromium dioxide particles across the width of the recording member on which a magnetic pattern is to be replicated for a time period in the range of from 0.01 to 5 milliseconds while in contact with the prerecorded magnetizable medium, said chromium dioxide particles being heated to above their Curie temperature, (c) cooling the chromium dioxide particles to below their Curie temperature while in intimate contact with the prerecorded medium for a time period in the range from 0.1 to 100 milliseconds.

17. The process of claim 16 wherein the chromium dioxide particles are heated for 0.1 to 0.4 milliseconds.

18. The process of claim 16 wherein the chromium dioxide particles are cooled for 0.5 to 4 milliseconds.

19. The process of claim 16 wherein the recording member and the prerecorded magnetizable medium each moves at the same speed in the range of 25 to 100 inches per second.

20. The process of claim 16 wherein the beam of energy is from a laser.

21. The process of claim 16 wherein the pressure upon the recording member and the magnetizable medium is at least 5 pounds per square inch.

22. The process of claim 21 wherein the pressure is in the range of from 15 to 500 pounds per square inch.

23. The process of claim 22 wherein the pressure is in the range of from 50 to 250 pounds per square inch.

24. The process of claim 23 wherein the beam of energy is a laser.

25. The process of claim 16 wherein the beam of energy is formed to a stationary line beam which spans the width of the recording member.

26. An apparatus comprising
(a) supply and takeup means for a flexible magnetizable recording member,
(b) supply and takeup means for a flexible prerecorded magnetizable medium,
(c) pressure means to allow contact of the recording member and the magnetizable medium whereby at least a portion of said pressure means is transparent to a beam of energy,
(d) heating means to generate a continuous beam of energy which is directed without scanning through at least a portion of the pressure means which is transparent to the energy beam wherein the heating means focuses a stationery line beam which line beam spans the width of the recording member with substantially uniform power density.

* * * * *